US011973282B2

(12) United States Patent
Zhu et al.

(10) Patent No.: US 11,973,282 B2
(45) **Date of Patent: *Apr. 30, 2024**

(54) BROADBAND DECOUPLED MIDBAND DIPOLE FOR A DENSE MULTIBAND ANTENNA

(71) Applicant: John Mezzalingua Associates, LLC, Liverpool, NY (US)

(72) Inventors: Jiaqiang Zhu, Baldwinsville, NY (US); Niranjan Sundararajan, Clay, NY (US); Wengang Chen, Liverpool, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,187

(22) Filed: Mar. 7, 2023

(65) Prior Publication Data

US 2023/0208039 A1 Jun. 29, 2023

Related U.S. Application Data

(63) Continuation of application No. 17/689,278, filed on Mar. 8, 2022, now Pat. No. 11,605,893.

(60) Provisional application No. 63/158,028, filed on Mar. 8, 2021.

(51) Int. Cl.
*H01Q 21/26* (2006.01)
*H01Q 5/20* (2015.01)
*H01Q 9/26* (2006.01)

(52) U.S. Cl.
CPC ................. *H01Q 9/26* (2013.01); *H01Q 5/20* (2015.01)

(58) Field of Classification Search
CPC .......... H01Q 9/26; H01Q 9/285; H01Q 9/065; H01Q 9/265; H01Q 5/20; H01Q 5/364; H01Q 5/42; H01Q 5/48; H01Q 21/26
See application file for complete search history.

(56) References Cited

U.S. PATENT DOCUMENTS

| | | | |
|---|---|---|---|
| 9,570,804 | B2 | 2/2017 | Shang et al. |
| 9,698,486 | B2 | 7/2017 | Shooshtari et al. |
| 9,711,871 | B2 | 7/2017 | Jones |
| 9,819,084 | B2 | 11/2017 | Zimmerman et al. |
| 9,831,548 | B2 | 11/2017 | Timofeev et al. |
| 10,439,285 | B2 | 10/2019 | Isik et al. |
| 10,547,110 | B1 | 1/2020 | Isik et al. |

(Continued)

FOREIGN PATENT DOCUMENTS

| | | |
|---|---|---|
| WO | 2014100938 A1 | 7/2014 |
| WO | 2016081036 A1 | 5/2016 |

(Continued)

OTHER PUBLICATIONS

Written Opinion and Search Report issued in PCT/US2022/019261 dated Jun. 21, 2022 (9 pages).

*Primary Examiner* — Awat M Salih
(74) *Attorney, Agent, or Firm* — Meunier Carlin & Curfman LLC

(57) ABSTRACT

Disclosed is a midband dipole for use in a multiband antenna. The midband dipole has four folded dipoles, each of which is coupled to a decoupling circuit that has two capacitance points. The disclosed decoupling circuit configuration mitigates common mode resonance with nearby lowband dipoles, further preventing cross polarization in the midband.

6 Claims, 11 Drawing Sheets

(56) References Cited

U.S. PATENT DOCUMENTS

| | | | |
|---|---|---|---|
| 10,601,120 | B2 | 3/2020 | Bisiules et al. |
| 10,644,401 | B2 | 5/2020 | Shang et al. |
| 11,196,168 | B2 * | 12/2021 | Wu ........................ H01Q 1/246 |
| 2007/0241983 | A1 | 10/2007 | Cao et al. |
| 2014/0159977 | A1 | 6/2014 | Jones |
| 2016/0285169 | A1 | 9/2016 | Shooshtari et al. |
| 2017/0062940 | A1 | 3/2017 | Cao |
| 2018/0323513 | A1 | 11/2018 | Varnoosfaderani et al. |
| 2020/0127389 | A1 | 4/2020 | Li et al. |
| 2020/0185838 | A1 | 6/2020 | Li et al. |
| 2020/0321700 | A1 | 10/2020 | Wu et al. |
| 2020/0328533 | A1 | 10/2020 | Sundararajan et al. |
| 2020/0335881 | A1 | 10/2020 | Le |

FOREIGN PATENT DOCUMENTS

| | | | |
|---|---|---|---|
| WO | 2017176386 | A1 | 10/2017 |
| WO | 2017177091 | A1 | 10/2017 |

* cited by examiner

BROADBAND DECOUPLED MIDBAND DIPOLE FOR A DENSE MULTIBAND ANTENNA

This application is a continuation of U.S. patent application Ser. No. 17/689,278, filed Mar. 8, 2022, which claims priority to U.S. Provisional Patent Application Ser. No. 63/158,028, filed Mar. 8, 2021, which application is hereby incorporated by this reference in its entirety as if fully set forth herein.

BACKGROUND OF THE INVENTION

Field of the Invention

The present invention relates to wireless communications, and more particularly, to antennas that incorporate multiple dipole arrangements in several frequency bands.

Related Art

The introduction of new spectrum for cellular communications presents challenges for antenna designers. In addition to the traditional lowband (LB) and midband (MB) frequency regimes (617-894 MHz and 1695-2690 MHz, respectively), the introduction of C-Band and CBRS (Citizens Broadband Radio Service) provides additional spectrum of 3.4-4.2 GHz. Further, there is demand for enhanced performance in the C-B and, including 4×4 MIMO (Multiple Input Multiple Output as well as 8T8R (8-port Transmit, 8-port Receive) with beamforming.

The introduction of new and higher frequency bands, an addition to existing lowband and midband arrays, increases the packing density of radiators within macro antennas. Given the constraints of weight and wind loading, it is not desirable to increase the size of the antennas to accommodate dipole arrays of the new frequency bands, thereby by driving increased packing densities of radiators within existing radome designs. However, closer placement of dipoles of different frequency bands leads to performance degradation in the form of cross polarization and gain pattern contamination due to coupling and reradiation between frequency bands. This problem is particularly challenging in the case of RF interaction between midband and lowband dipoles, predominantly in the form of cross polarization. To complicate this challenge, there is considerable demand for a wide bandwidth in the midband (e.g., 1.7-2.7 GHz), which potentially aggravates the problem of cross polarization between the midband and the lowband.

Increasing packing density presents the considerable challenges, primarily from mutual coupling of dipoles of different frequency bands and the resulting cross polarization and other interference effects. An example of this is when radiation emitted by a lowband dipole causes excitation within portions of a nearby midband dipole, and the subsequent radiation emitted by the midband dipole couples back into the lowband dipole. The cross-coupled radiation may have a degraded polarization quality that, once coupled back into the lowband dipole, contaminates the isolation between the two radiated polarization states of the lowband dipole. This cross polarization interference can severely degrade beam quality and thus the performance of the antenna. As mentioned above, a conventional approach to preventing cross polarization is to distance the midband dipoles from the lowband dipoles, but this solution violates the requirement of minimizing antenna wind loading.

Accordingly, what is needed is a midband dipole design that offers strong performance, wide bandwidth while minimizing cross polarization.

SUMMARY OF THE DISCLOSURE

An aspect of the present disclosure involves a radiator for a multiband antenna. The radiator comprises a crossed dipole plate having four folded dipole arms disposed thereon, the four folded dipole arms arranged in a cross pattern; four decoupling circuits disposed on the crossed dipole plate, each of the four decoupling circuits coupled to a corresponding folded dipole arm, each of the four decoupling circuits having a first capacitive pad, a second capacitive pad, and first inductive trace coupled to the first capacitive pad, wherein he first conductive pad, the second conductive pad, and the first conductive trace are disposed on a first side of the crossed dipole plate; and a pair of crossed balun stem plates mechanically coupled to the crossed dipole plate, each of the crossed balun stem plates having a pair of ground layers, each of the ground layers having a first conductive stem contact and a second conductive stem contact, wherein the first conductive stem contact is electrically coupled to the first capacitive pad and the second conductive stem contact is electrically coupled to the second capacitive pad.

DESCRIPTION OF EXEMPLARY EMBODIMENTS

Figure 1:
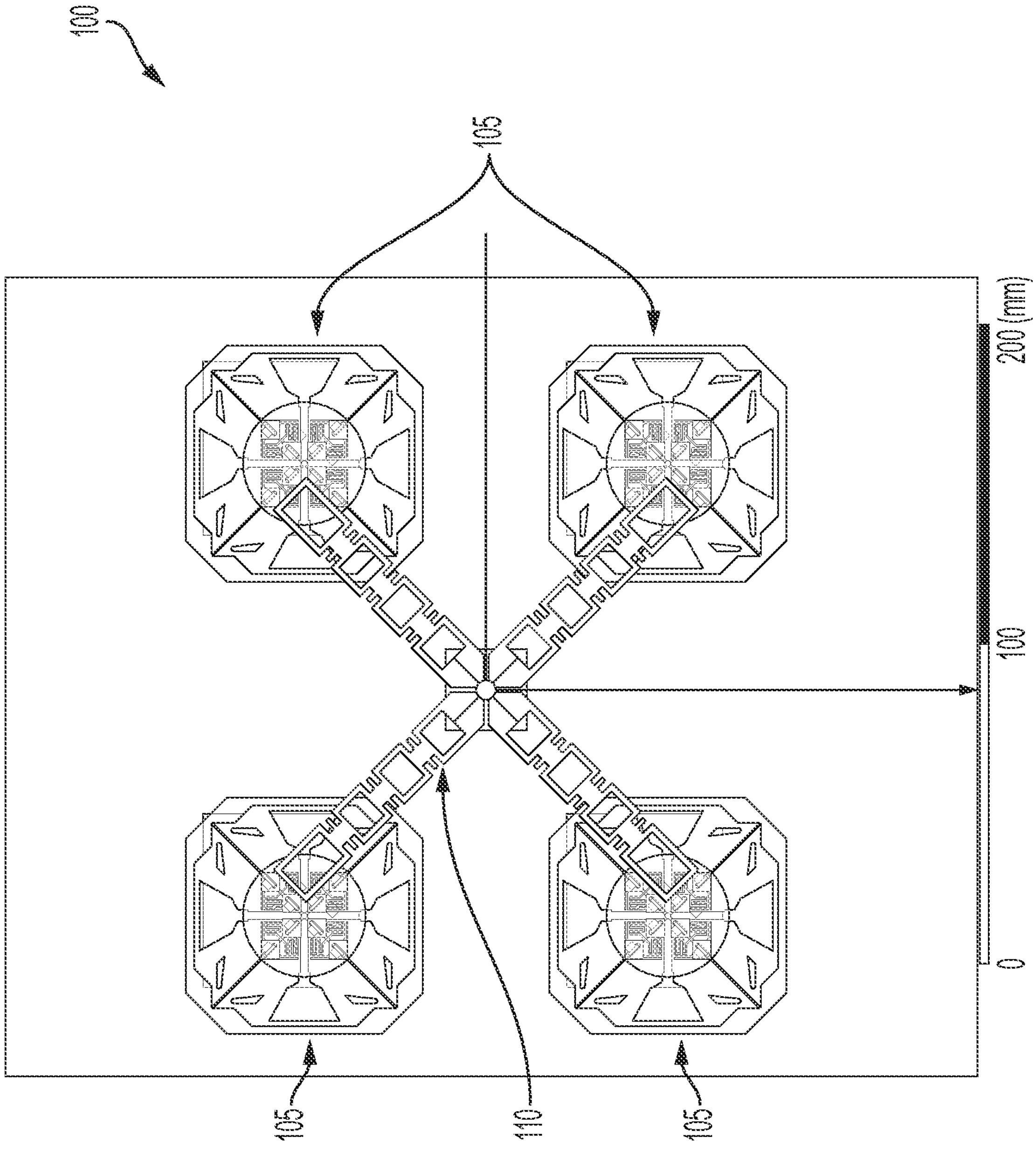
FIG. 1 illustrates an exemplary antenna unit cell having four exemplary midband dipole assemblies and a low band dipole assembly according to the disclosure.

FIG. 1 illustrates an exemplary antenna unit cell 100 having four exemplary midband dipole assemblies 105 and a low band dipole assembly 110 according to the disclosure. Exemplary unit cell 100 may be one of a series of such unit cells 100 arranged within an antenna array face. Although unit cell 100, as illustrated, has a specific arrangement of lowband dipole 110 and midband dipoles 105, it will be understood that variations to this configuration are possible and within the scope of the disclosure. Further, it will be understood that a given array face make have a sequence of exemplary unit cells 100, or it may have an arrangement of one or more illustrated unit cells 100 in combination with other unit cells 100 having different specific configurations.

As illustrated in FIG. 1, unit cell 100 has its midband dipole assemblies 105 in close proximity with lowband dipole assembly 110 such that lowband dipole assembly 110 has dipole arms that extend over the midband dipole assemblies 105.

Figure 2:
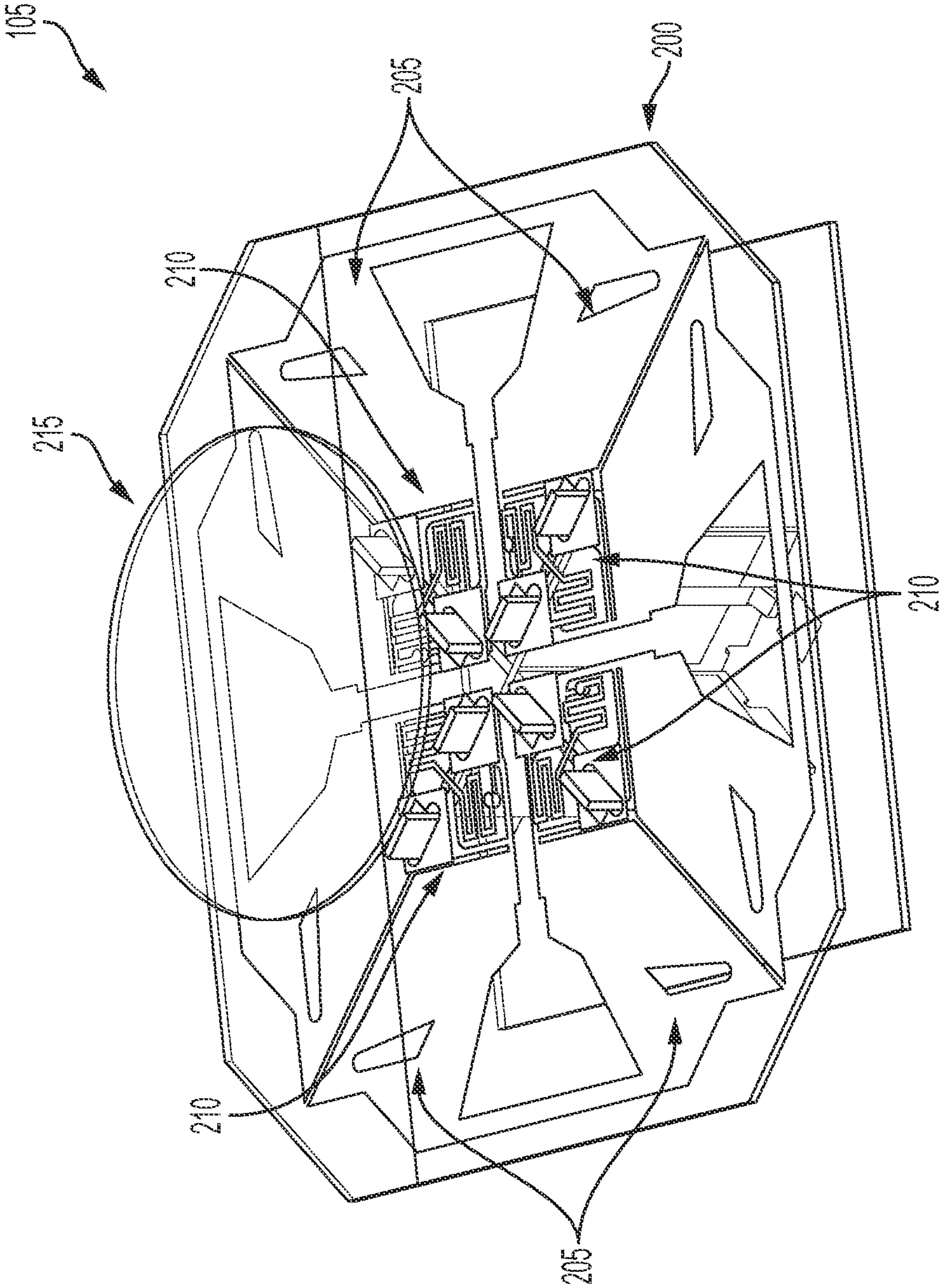
FIG. 2 is an isometric view of an exemplary midband dipole assembly according to the disclosure.

FIG. 2 is an isometric view of an exemplary midband dipole assembly 105 according to the disclosure. Midband dipole assembly 105 has a midband dipole plate 200. Disposed on an underside of the printed circuit board (PCB) of midband dipole plate 200 are four folded dipole arms 205, each of which is coupled to a corresponding decoupling circuit 210. Disposed above midband dipole plate 200 is a passive radiator 215. Midband dipole assembly 105 also has a balun stem having two balun stem ground layers (obscured in FIG. 2) that are described below with respect to other illustrations.

Figure 3A:
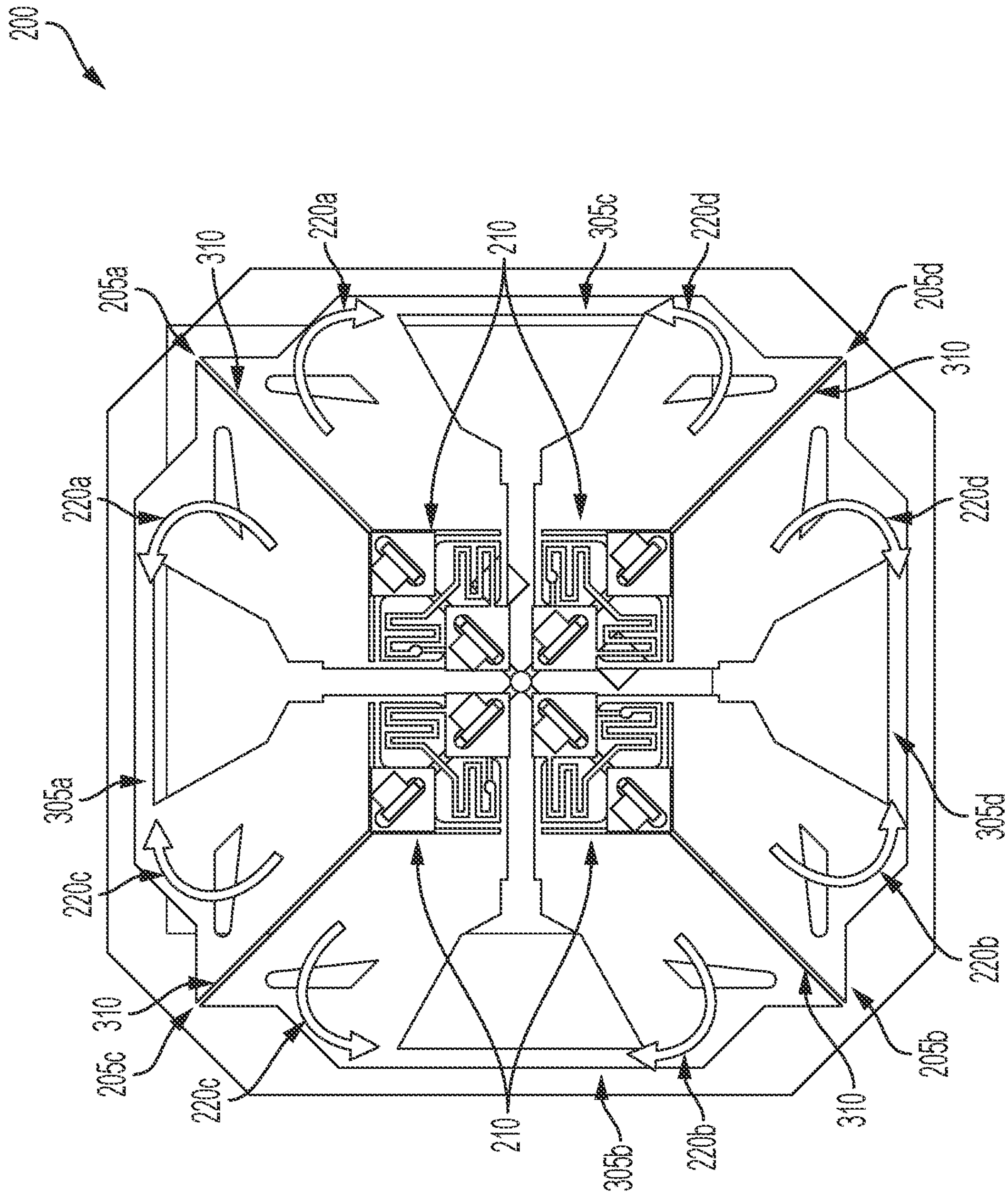
FIG. 3A is a plan view of the exemplary midband dipole assembly of FIG. 2, but with the passive radiator removed for the purposes of illustration.

FIG. 3A is a plan view of the exemplary midband dipole plate 200. Midband dipole plate 200 has four folded dipole arms 205*a*, 205*b*, 205*c*, and 205*d*. Each of the folded dipole arms 205*a/b/c/d* has a decoupling circuit 210 coupled to it. Further, each of the folded dipole arms 205*a/b/c/d* has a split 310 that defines two distinct current paths for each of the folded diple arms 205*a/b/c/d*. With the split 310, folded dipole arm 205*a* is divided into two mirrored arms, one of which is electrically coupled to folded dipole arm 205*c* via a connecting trace 305*a*, and the other is electrically coupled to folded dipole arm 205*d* via connecting trace 305*c*. In a similar manner, folded dipole 205*b* has a split 310 that divides it into two mirrored arms, one of which is electrically coupled to folded dipole arm 205*c* via connecting trace 305*b*, and the other of which is electrically coupled to folded dipole arm 205*d* via connecting trace 305*d*.

The operation of the folded dipole arms 205*a/b/c/d* on midband dipole plate 200 may be described as follows. Folded dipole arms 205*a* and 205*b* correspond to a −45 degree polarization, and folded dipole ams 205*c* and 205*d* correspond to a +45 degree polarization. An RF signal coupled to folded dipole arm 205*a* gets divided into two equal current flows 220*a*, one of which flows across connecting trace 305*a* to folded dipole arm 205*c*, and the other flows across connecting trace 305*c* to folded dipole arm 205*d*. Similarly, RF signal coupled to folded dipole arm 205*b* (which is the same RF signal as that applied to folded dipole arm 205*a*) gets divided into two equal current flows 220*b*, one of which flows across connecting trace 305*b* to folded dipole arm 205*c*, and the other flows across connecting trace 305*d* to folded dipole arm 205*d*. The superposition of current flows 220*a* and 220*b* through all four radiator arms 205*a/b/c/d* results in a −45 degree polarized radiated RF signal, whereby the RF emission components that are orthogonal to the −45 degree axis are mirrored on each side of the axis and are thus canceled via destructive interference, resulting in RF emission with polarization soleley along the −45 degree axis defined by folded dipole arms 205*a/b*.

The function is similar for the +45 degree polarized signal applied to folded dipole arms 205*c* and 205*d*. An RF signal coupled to folded dipole arm 205*c* gets divided into two equal current flows 220*c*, one of which flows across connecting trace 305*a* to folded dipole arm 205*a*, and the other flows across connecting trace 305*b* to folded dipole arm 205*b*. Similarly, RF signal coupled to folded dipole arm 205*d* (which is the same RF signal as that applied to folded dipole arm 205*c*) gets divided into two equal current flows 220*d*, one of which flows across connecting trace 305*c* to folded dipole arm 205*a*, and the other flows across connecting trace 305*d* to folded dipole arm 205*b*. The superposition of current flows 220*c* and 220*d* results in a +45 degree polarized radiated RF signal. The RF signal applied to folded dipole arms 205*c*/205*d* may be a completely different signal than the RF signal applied to folded dipole arms 205*a*/205*b*.

The specific shape of folded dipole arms 205*a/b/c/d* have features, such as gaps within the arms and the geometries of the outer edges of each arm, provides for good performance across the entire midband range of 1.7-2.7 GHz.

Each folded dipole arm 205*a/b/c/d* is coupled to a corresponding decoupling circuit 210, which minimizes common mode resonance with any nearby lowband dipole 110, further preventing cross polarization in the midband. The design of exemplary decoupling circuit 210 provides for resonance in the lowband (in particular, by resonating at $\lambda/8$, whereby $\lambda$ is the wavelength of the lowband center frequency). By achieving lowband resonance in each exemplary decoupling circuit 210, each folded dipole arm 205*a/b/c/d* may operate with broad midband bandwidth without common mode resonance with the lowband dipoles 110, and thus prevent cross polarization.

Figure 3B:
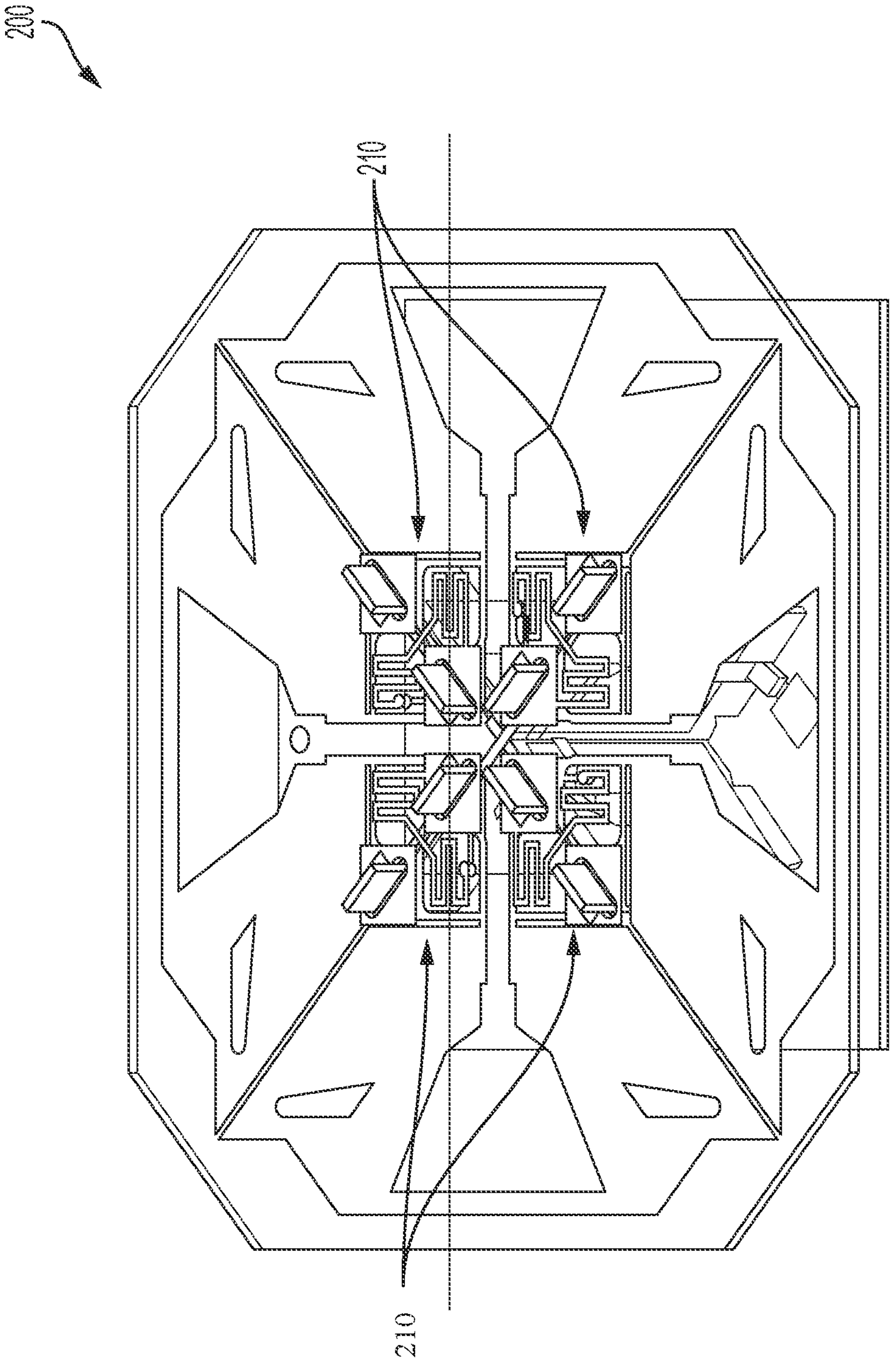
FIG. 3B is an isometric view of the exemplary midband dipole assembly of FIG. 3A.

FIG. 3B is an isometric view of midband dipole assembly 105, with passive radiator 215 removed for illustrative purposes.

Figure 4A:
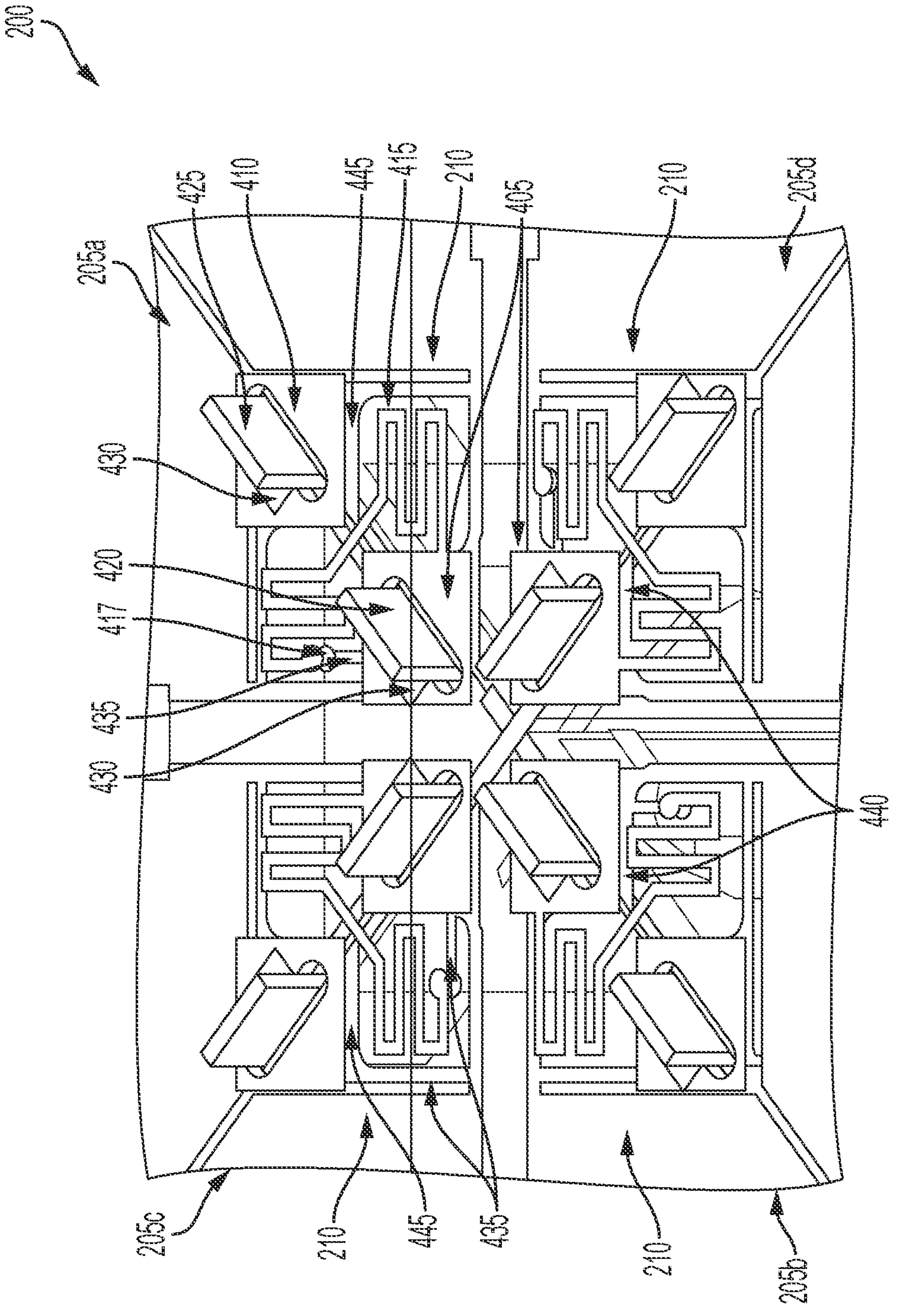
FIG. 4A is a close-up isometric view of the decoupling circuits for the four arms of the folded dipole of an exemplary midband dipole assembly.

FIG. 4A is a zoomed-in view of upper surface of the midband dipole plate 200 of FIG. 3B, showing the four decoupling circuits 210. As illustrated, the four decoupling circuits 210 may be mirror images of each other's diagonal counterpart. To prevent over cluttering FIG. 4A, the components of a single decoupling circuit 210 may be used for given reference numbers and indicating arrows. It will be understood that the same reference numbers apply to the counterpart components of the other decoupling circuits 210 as well. Referring to the features on the upper surface of the PCB, each decoupling circuit 210 has a first capacitance pad 405 and a second capacitance pad 410. Electrically coupled to first capacitance pad 405 is an inductive trace 415, which follows a meander pattern between first capacitance pad 405 and second capacitance pad 410 and ends at a via 417, through which inductive trace 415 passes through the printed circuit board (PCB) on which folded dipole arms 205*a/b/c/d* are disposed. Inductive trace 415 passes through via 417 to couple to lower inductive trace 435 disposed on the lower surface of the PCB.

Referring to the lower surface of the PCB of midband dipole plate 200, each decoupling circuit 210 has a first lower capacitance pad 440 that is disposed opposite first capacitance pad 405, and a second lower capacitance pad 445 that is disposed opposite second capacitance pad 410. As illustrated, lower inductive trace 435 is electrically coupled to first lower capacitance pad 440, lower second capacitance pad 445, and corresponding one of folded dipole arms 205*a/b/c/d*.

Further, as illustrated in FIG. 4A, midband dipole plate 200 is mechanically coupled to the crossed balun stem plates by first balun stem tab 420 and second balun stem tab 425. Disposed on first balun stem tab 420 is a first conductive stem contact (not shown), which electrically couples first capacitance pad 405 to its corresponding RF signal source on its balun stem (not shown) via solder joint 430. Disposed on second balun stem tab 425 is a second conductive stem contact (not shown), which electrically couples second capacitance pad 410 to its corresponding RF signal source on its balun stem (not shown) via solder joint 430.

The addition of a second capacitance pad 410/445, and the meander length of inductive traces 415 and 435, provides sufficient capacitance and inductance to have the decoupling circuit 210 achieve resonance at λ/8 of the lowband center frequency. It does this while not affecting the tuning of the midband dipole assembly 105 so that it has strong performance from 1.7 GHz through 2.7 GHz. In the illustrated exemplary embodiment, the inductive length of decoupling circuit may be 84 mm, although it will be understood that different lengths and other such variations are possible and within the scope of the disclosure.

Figure 4B:
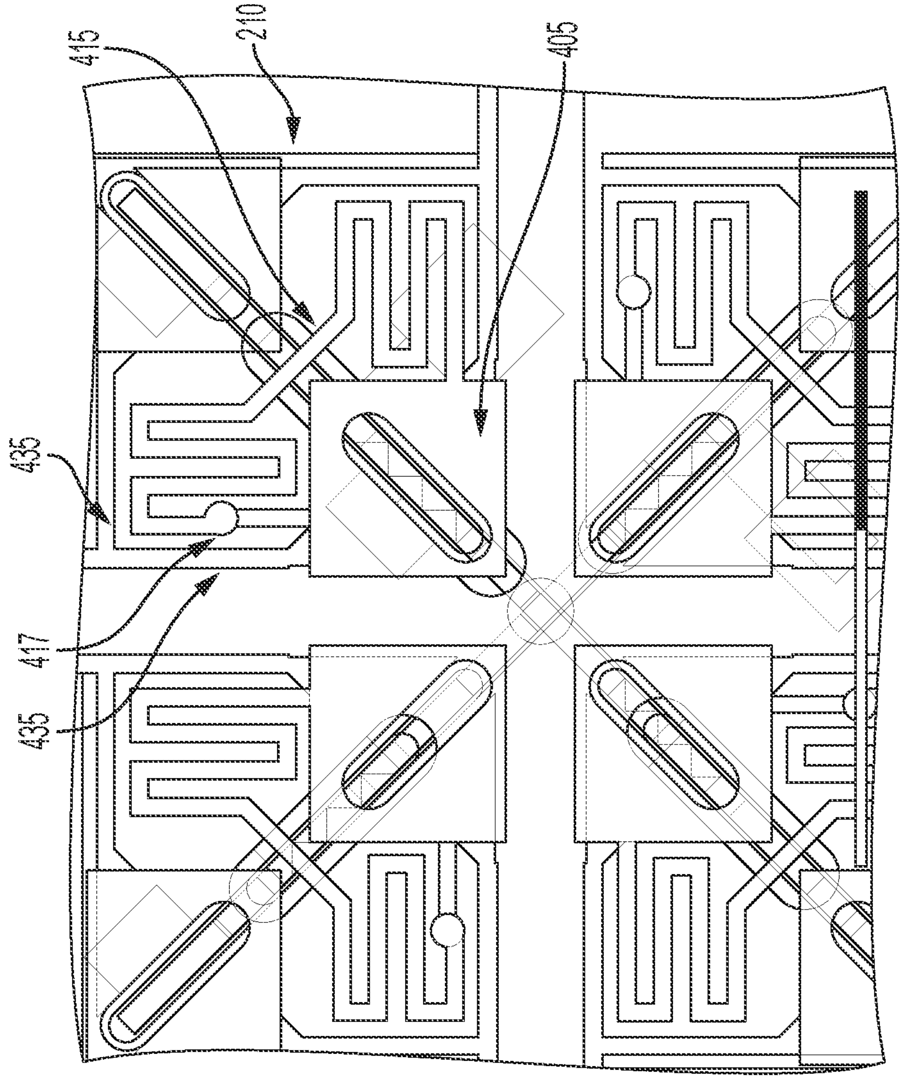
FIG. 4B is a close up plan view of the decoupling circuits illustrated in FIG. 4A, highlighting a single exemplary first capacitance pad with a coupled exemplary inductive trace according to the disclosure.

FIG. 4B is a close up plan view of the decoupling circuits 210, highlighting a single exemplary first capacitance pad 405 with a coupled exemplary inductive trace 415 according to the disclosure. As illustrated, inductive trace 415 couples to a via 417, through which it couples to lower inductive trace 435 on the underside of the PCB of midband dipole plate 200.

Figure 5:
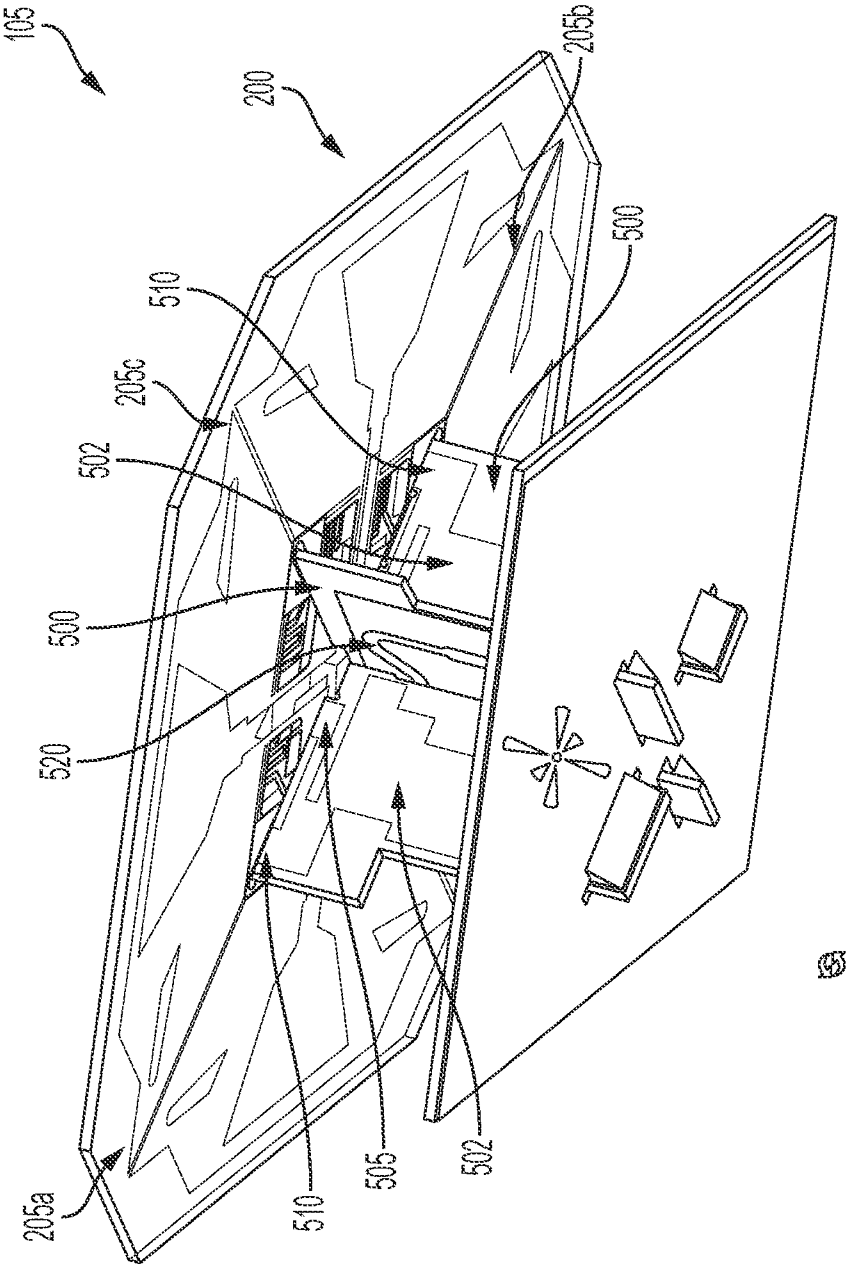
FIG. 5 is an isometric view illustrating the underside of an exemplary midband dipole assembly.

FIG. 5 is an isometric view illustrating the underside of exemplary midband dipole assembly 105. The PCB of midband dipole plate 200 is rendered transparent for the purpose of illustration. Illustrated are two balun stem plates 500 that are interlocked at right angles to each other. Disposed on each balun stem plate 500 are two ground layers 502. As illustrated, one of the ground layers 502 is coupled to folded dipole arm **205*a* and the other disposed on the same balun stem plate 500 is coupled to folded dipole arm 205*b*. As illustrated, each ground layer 502 has a first coupling point 505 where ground layer 502 electrically couples to capacitive pad 405, and a second coupling point 510 where ground layer 502 electrically couples to capacitive pad 410. Disposed on the opposite side of each balun stem plate 500 is balun trace 520**.

Figure 6:
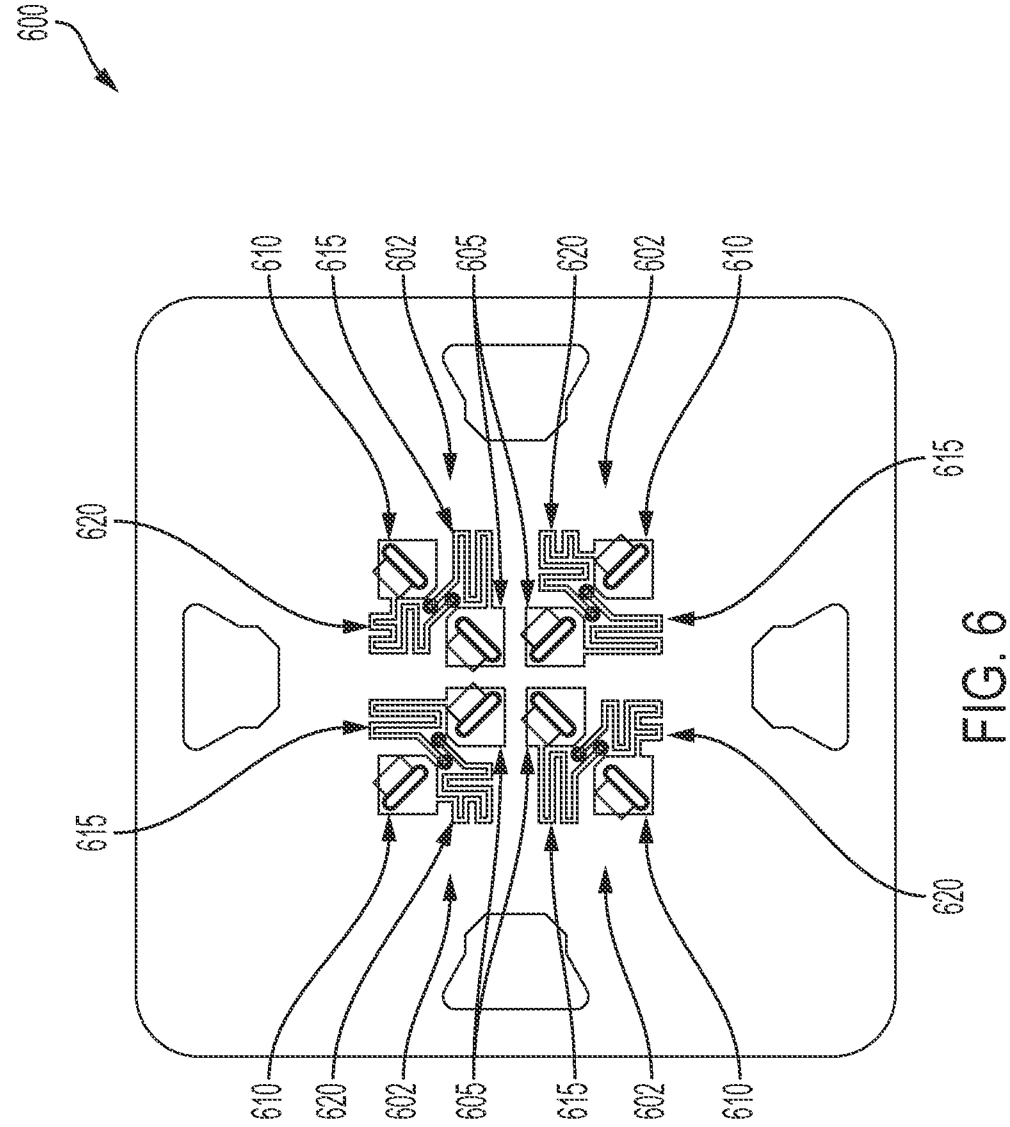
FIG. 6 illustrates an upper surface of a second exemplary midband dipole plate according to the disclosure.

FIG. 6 illustrates an upper surface circuit layout of a second exemplary midband dipole plate 600 according to the disclosure. The upper surface circuit layout has four decoupling circuits 602. Each decoupling circuit 602 has a first capacitance pad 605 and second capacitance pad 610, which may be similar to the respective first capacitance pad 405 and second capacitance pad 410 disclosed above.

Electrically coupled to first capacitance pad 605 is a first inductive trace 615, which has a first meander path that terminates in a first via, through which first inductive trace 615 couples to a first lower inductive trace (not shown). Further, electrically coupled to second capacitance pad 610 is a second inductive trace 620, which has a second meander path that terminates in a second via, through which second inductive trace 620 couples to a second lower inductive trace (not shown). First capacitance pad 605 and second capacitance pad 610 may couple to their respective balun ground layers (not shown) via a solder pad similar to that disclosed above.

Figure 7:
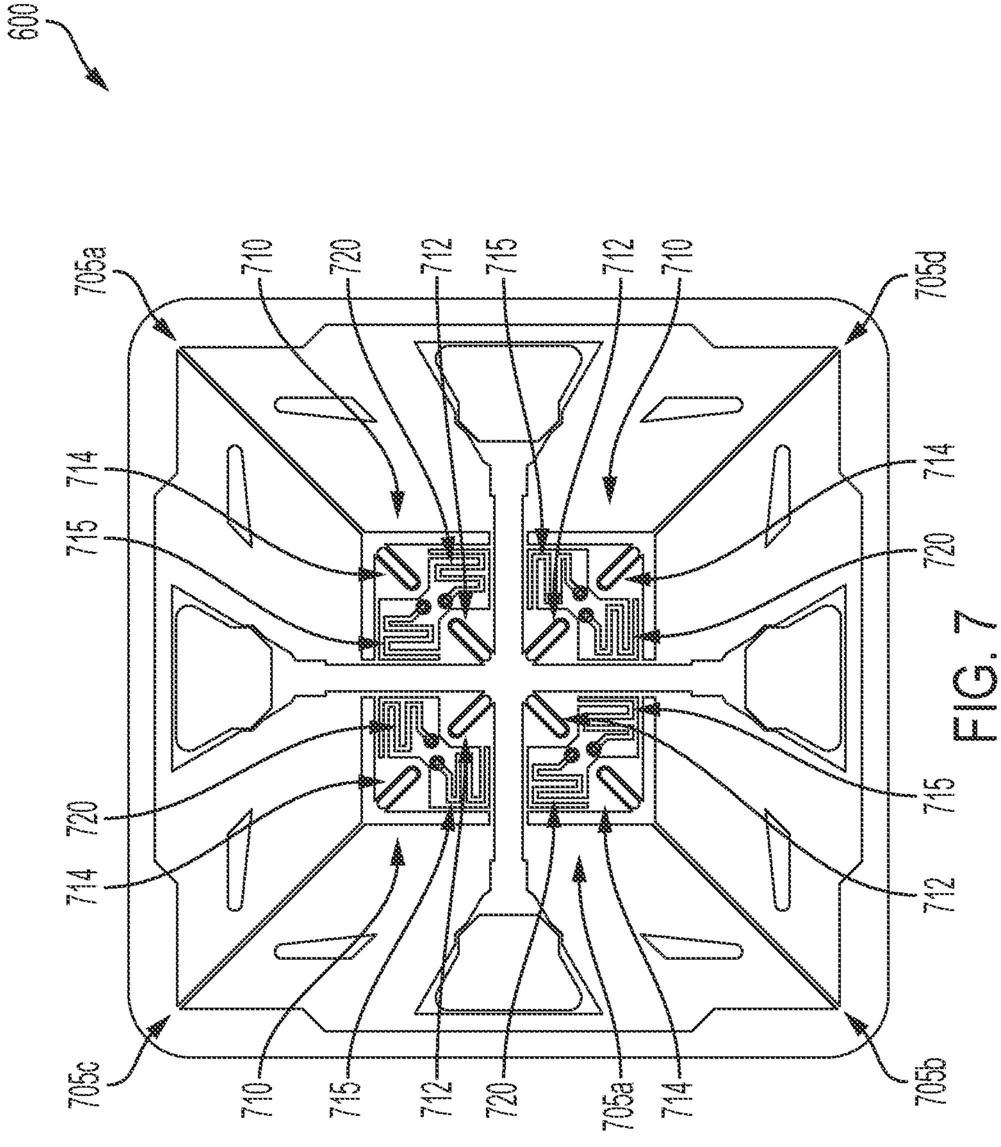
FIG. 7 illustrates a lower surface of a second exemplary midband dipole plate according to the disclosure.

FIG. 7 illustrates a lower surface circuit layout of the second exemplary midband dipole plate 700 according to the disclosure. Lower surface circuit layout 700 has four folded dipole arms **705*a/b/c/d* that are similar in structure and function to the folded dipole arms 205*a/b/c/d* disclosed above. Each folded dipole arm 705*a/b/c/d* is coupled to a corresponding lower decoupling circuit 710. Each lower decoupling circuit 710 has a first lower capacitance pad 712 and a second lower capacitance pad 714. First lower capacitance pad 712 is diposed on the PCB opposite to corresponding first capacitance pad 605, which is disposed on the PCB's upper surface, resulting in a capacitive coupling between first capacitance pad 605 and first lower capacitance pad 712. Second lower capacitance pad 714 is disposed on the PCB opposite to the second capacitance pad 610, resulting in a capacitive coupling between first capacitance pad 610 and first lower capacitance pad 714. First lower capacitance pad 712 is not conductively coupled to the corresponding balum stem contact (not shown) on its corresponding first balun stem tab 420; and second lower capacitance pad 714 is not conductively coupled to the corresponding balum stem contact (not shown) on its corresponding second balun stem tab 425**.

Conductively coupled to first lower capacitance pad 712 is a first lower inductive trace 715, which has a meander path that terminates at the first via through which it conductively couples to first inductive trace 615 disposed on the upper surface of the PCB. Similarly, conductively coupled to first lower capacitance pad 714 is a first lower inductive trace 720, which has a meander path that terminates at the second via through which it conductively couples to first inductive trace 620 disposed on the upper surface of the PCB.

The addition of a second capacitance pads 714 and 610, and the meander length of inductive traces 615/715 and 620/720, provides sufficient capacitance and inductance to have the decoupling circuit 610/710 achieve resonance at λ/8 of the lowband center frequency. It does this while not affecting the tuning of the second exemplary midband dipole plate so that it has strong performance from 1.7 GHz through 2.7 GHz. In the illustrated exemplary embodiment the inductive length of decoupling circuit may be 84 mm, although it will be understood that different lengths and other such variations are possible and within the scope of the disclosure.

Figure 8:
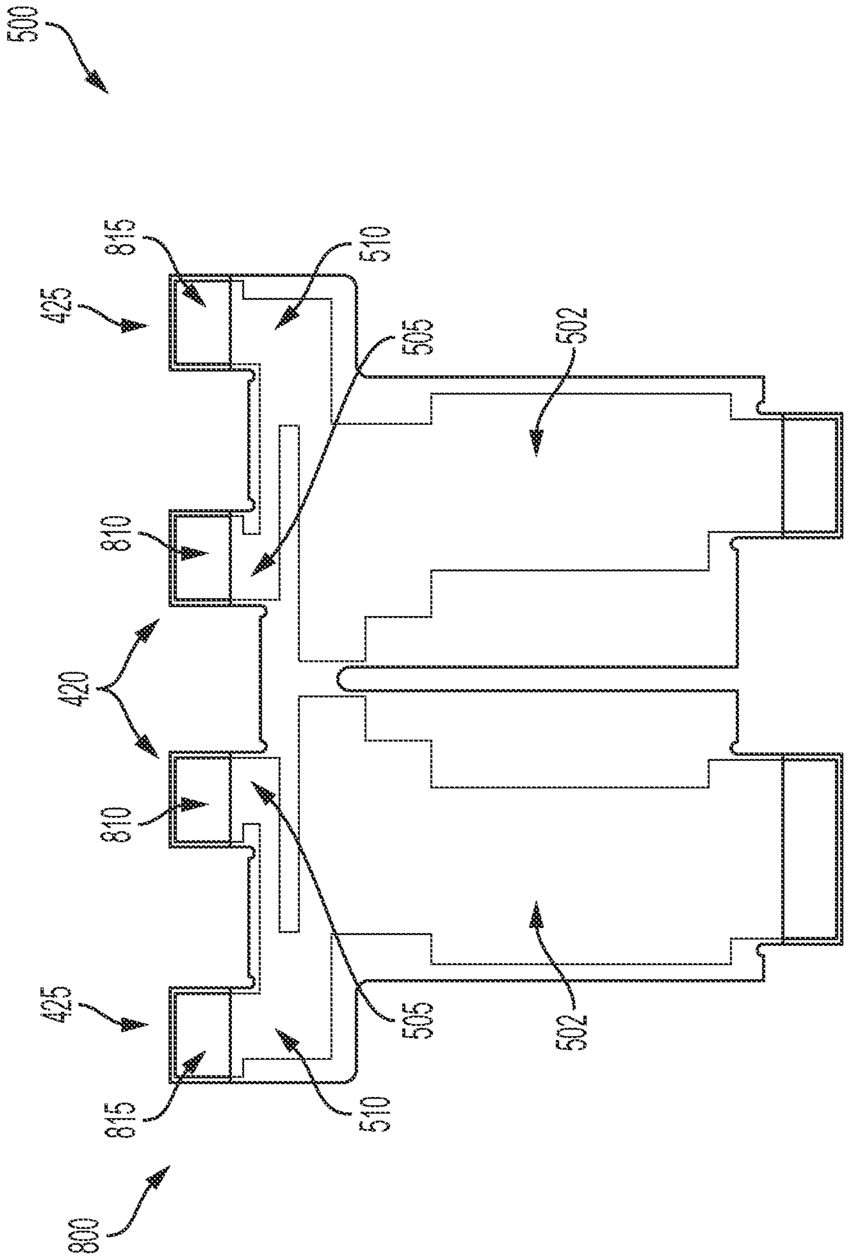
FIG. 8 illustrates a first side of an exemplary balun stem according to the disclosure.

FIG. 8 illustrates a first side 800 of an exemplary balun stem 500 according to the disclosure. First side 800 has pair of ground layers 502. A given pair of ground layers 502 are configured to be electrically coupled to folded dipole arm pairs **205*a/b*, 205*c/d*, 705*a/b*, or 705*c/d*. Each ground layer 502 has a first conductive stem contact 810 that is located at first coupling point 505 and is disposed on first balun stem tab 420; and a second conductive stem contact 815 that is located at second coupling point 510 and disposed on second balun stem tab 425**.

In an exemplary embodiment, midband dipole plates 200/600 may be formed of a PCB material such as ZYF300CA-C, having a thickness of 30 mil, and the conductive elements and traces formed on the PCB according to the disclosure may be formed of Copper having a thickness of 1.4 mil. It will be understood that such materials and dimensions are exemplary, and that variations to these are possible and within the scope of the disclosure.

Figure 9:
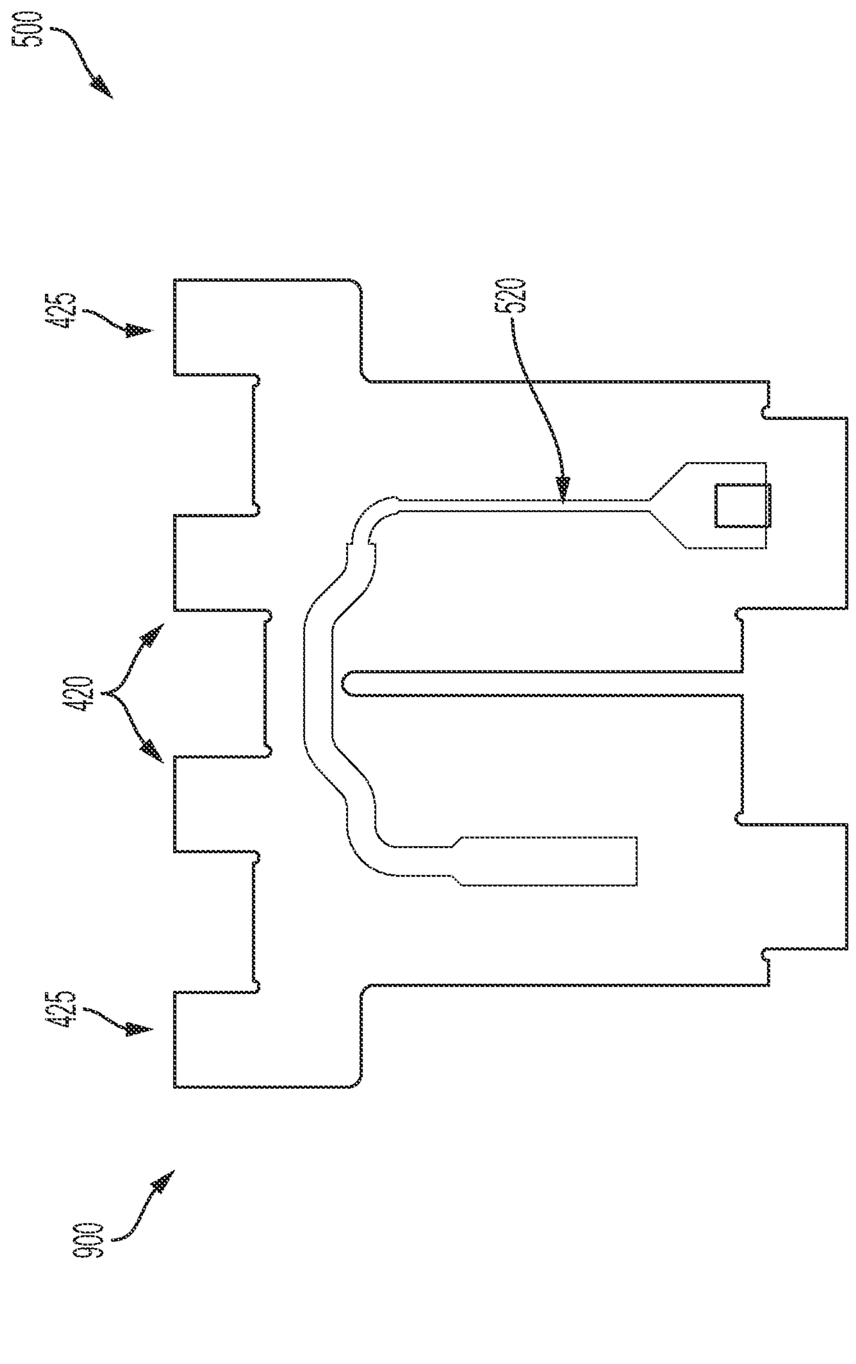
FIG. 9 illustrates a second side of an exemplary balun stem according to the disclosure.

FIG. 9 illustrates a second side 900 of exemplary balun stem 500 according to the disclosure. Disposed on second side 900 is balun trace 520, which provides an RF signal from a feedboard (not shown) to the two ground layers 502, which in turn conduct the RF signal to capacitive pads 405 and 410 of induction circuits 210/610, which in turn couple the filtered RF signal (with the λ/8 signals decoupled to prevent common mode resonance and thus prevent cross polarization) to the folded dipole arm pairs **205*a/b*, 205*c/d*, 705*a/b*, or 705*c/d***.

Although the disclosure describes a midband dipole assembly 105 as having the decoupling features that minimizes cross polarization due to common mode resonance with the lowband dipole 110, it will be understood that the disclosed features and advantages may pertain to corresponding dipoles of other frequency bands and ranges, provided that the decoupling features of the higher frequency dipole correspond to λ/8 of the frequency of the lower frequency dipole. Accordingly, the disclosed midband dipole plates are example embodiment of a crossed dipole plate according to the disclosure.

What is claimed is:

1. A radiator for a multiband antenna, comprising:

a crossed dipole plate having folded dipole arms disposed thereon, the folded dipole arms arranged in a cross pattern;

decoupling circuits disposed on the crossed dipole plate, each of the decoupling circuits coupled to a corresponding folded dipole arm, each of the decoupling circuits having a first capacitive pad, a second capacitive pad, and a first inductive trace coupled to the first capacitive pad, wherein the first capacitive pad, the second capacitive pad, and the first inductive trace are disposed on a first side of the crossed dipole plate; and crossed balun stem plates mechanically coupled to the crossed dipole plate, each of the crossed balun stem plates having a pair of ground layers, each of the ground layers having a first conductive stem contact and a second conductive stem contact, wherein the first conductive stem contact is electrically coupled to the first capacitive pad and the second conductive stem contact is electrically coupled to the second capacitive pad.

2. The radiator of claim 1, wherein each of the decoupling circuits comprises: a first via through which the first inductive trace conductively couples to a second inductive trace disposed on a second side of the crossed dipole plate, wherein the second inductive trace is electrically coupled to the corresponding folded dipole arm.

3. The radiator of claim 2, further comprising a third inductive trace disposed on the first side of the crossed dipole plate, wherein the third inductive trace is electrically coupled to the second capacitive pad.

4. The radiator of claim 3, further comprising a second via through which the third inductive trace conductively couples to a fourth inductive trace disposed on the second side of the crossed dipole plate, wherein the fourth inductive trace is electrically coupled to the corresponding folded dipole arm.

5. The radiator of claim 1, further comprising: a first opposing capacitive pad disposed on a second side of the crossed dipole plate opposite the first capacitive pad, the first opposing capacitive pad electrically coupled to a second inductive trace; and a second opposing capacitive pad disposed on the second side of the crossed dipole plate opposite the second capacitive pad, the second opposing capacitive pad electrically coupled to a fourth inductive trace.

6. The radiator of claim 1, wherein the radiator is configured to operate in a midband frequency range.

* * * * *